(12) United States Patent
Watcharasakunee

(10) Patent No.: US 9,090,126 B1
(45) Date of Patent: Jul. 28, 2015

(54) ROLLER ASSEMBLY

(71) Applicant: Bobby Watcharasakunee, Victorville, CA (US)

(72) Inventor: Bobby Watcharasakunee, Victorville, CA (US)

( * ) Notice: Subject to any disclaimer, the term of this patent is extended or adjusted under 35 U.S.C. 154(b) by 0 days.

(21) Appl. No.: 14/573,181

(22) Filed: Dec. 17, 2014

(51) Int. Cl.
| *B60B 33/08* | (2006.01) |
| *B60B 33/00* | (2006.01) |
| *A61H 3/04* | (2006.01) |

(52) U.S. Cl.
CPC *B60B 33/08* (2013.01); *A61H 3/04* (2013.01); *B60B 33/001* (2013.01)

(58) Field of Classification Search
CPC .......... A45C 5/143; A45C 5/14; A45C 5/145; A45C 5/142; B60B 33/0002; B60B 33/0005; B60B 33/001; B60B 33/0015; B60B 33/0013; B60B 33/08; B62B 5/0083; B62B 2301/252
USPC ........ 16/30, 32, 33, 42 R, 31 R, 29, 39, 42 T; 248/188.8, 129, 346.11, 352, 188.4, 248/188.5, 188.1, 188.2, 188, 205.3, 683; 280/79.11, 3, 47.34, 47.35, 32.6; 135/66, 69, 70, 75–76, 85
See application file for complete search history.

(56) References Cited

U.S. PATENT DOCUMENTS

| 831,494 | A | * | 9/1906 | Alexander | 16/24 |
| 956,969 | A | * | 5/1910 | Hessey | 16/24 |
| 1,046,027 | A | * | 12/1912 | Sander | 16/24 |
| 1,389,572 | A | * | 9/1921 | Berg | 248/188.4 |
| 2,103,202 | A | * | 12/1937 | Green | 16/19 |
| 2,225,753 | A | * | 12/1940 | Milich | 16/26 |
| 2,457,723 | A | * | 12/1948 | Pura | 16/32 |
| 2,988,770 | A | * | 6/1961 | Arenson | 16/42 R |
| 3,524,456 | A | * | 8/1970 | Dixon | 135/65 |
| 4,094,330 | A | | 6/1978 | Jong | |
| 4,559,962 | A | | 12/1985 | Marchiano | |
| 5,713,382 | A | * | 2/1998 | Midcap | 135/84 |
| 5,727,284 | A | * | 3/1998 | Deutsch | 16/30 |
| 5,742,977 | A | * | 4/1998 | Hoofe, III | 16/30 |
| 5,911,235 | A | | 6/1999 | Henderson et al. | |
| D420,945 | S | | 2/2000 | Dobersztyn et al. | |
| 6,068,273 | A | | 5/2000 | Rao et al. | |
| 6,134,747 | A | * | 10/2000 | Leibman | 16/24 |
| 6,305,869 | B1 | * | 10/2001 | Chen | 403/109.5 |
| 6,910,246 | B2 | * | 6/2005 | Desmarais | 16/42 R |
| 6,972,042 | B2 | * | 12/2005 | Benson | 623/38 |
| 7,244,070 | B2 | * | 7/2007 | Burnett et al. | 396/420 |
| 7,644,719 | B2 | | 1/2010 | Galanty | |
| 7,743,780 | B1 | | 6/2010 | Eggan | |
| 8,348,293 | B1 | * | 1/2013 | Lasher | 280/250.1 |
| 8,608,118 | B2 | * | 12/2013 | Lai | 248/74.3 |
| 8,621,710 | B2 | * | 1/2014 | Carpinella et al. | 16/42 T |
| 2002/0121155 | A1 | * | 9/2002 | Wu | 74/551.7 |
| 2002/0167142 | A1 | * | 11/2002 | Chen | 280/87.041 |
| 2005/0205122 | A1 | | 9/2005 | Bly et al. | |
| 2008/0244870 | A1 | * | 10/2008 | Chase | 16/42 R |
| 2010/0170547 | A1 | * | 7/2010 | Pietrzak et al. | 135/75 |
| 2011/0240078 | A1 | * | 10/2011 | Lenhart et al. | 135/75 |

* cited by examiner

*Primary Examiner* — Chuck Mah

(57) ABSTRACT

A roller assembly includes a housing that has a top end, a bottom end and a peripheral wall extending therebetween. The top end has a first well extending downwardly therein. The bottom end has a second well extending upwardly therein. The top end has a groove extending downwardly therein. The groove extends into the first well. The first well may insertably receive a leg of a walker. The peripheral wall is convexly arcuate, giving the housing a spherical shape. A grip is positioned within the first well. The grip may engage the leg of the walker. A lock is coupled to the housing to releasably engage the leg. A roller is coupled to the housing. The roller may roll the walker along the support surface.

8 Claims, 3 Drawing Sheets

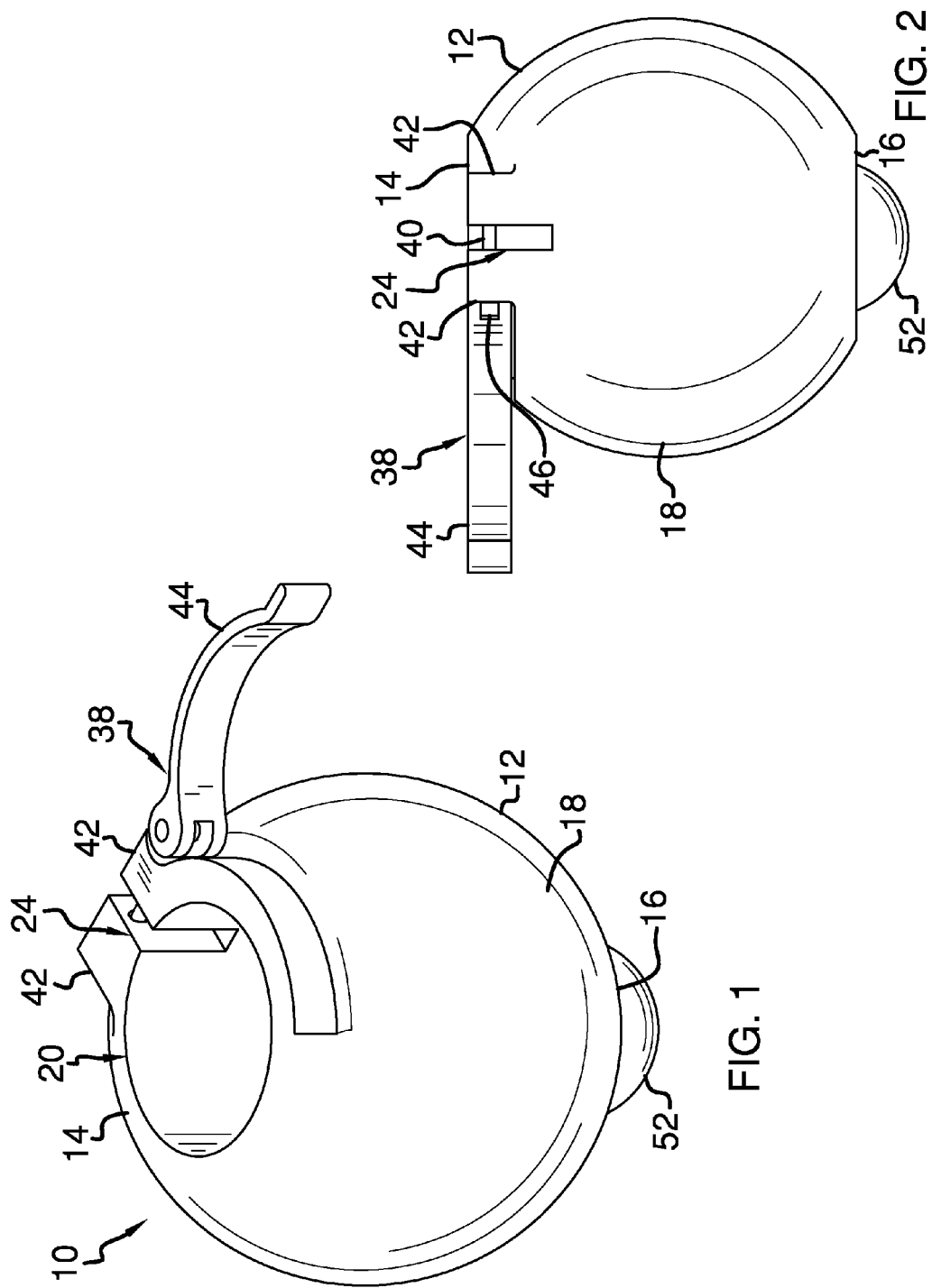

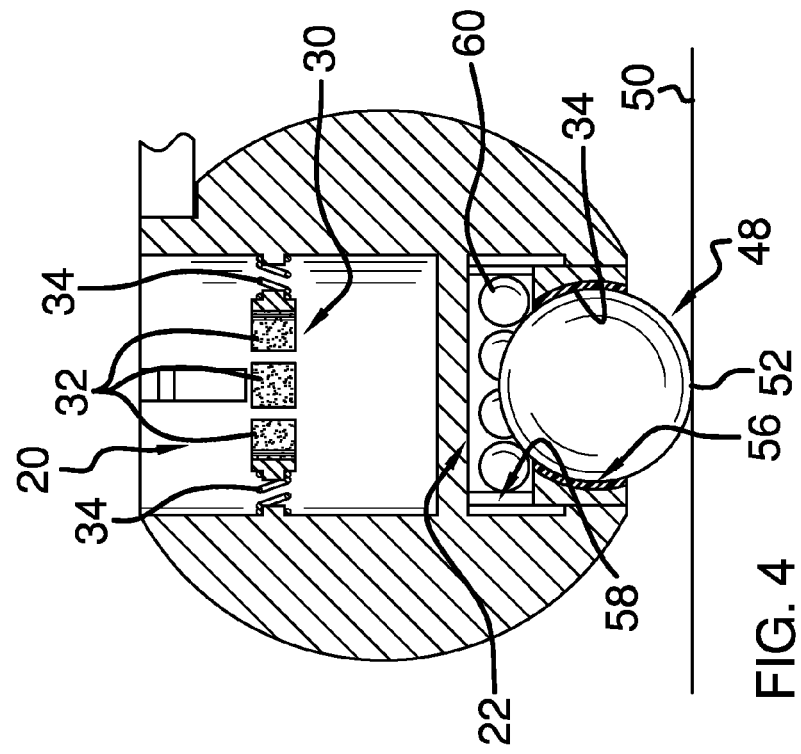
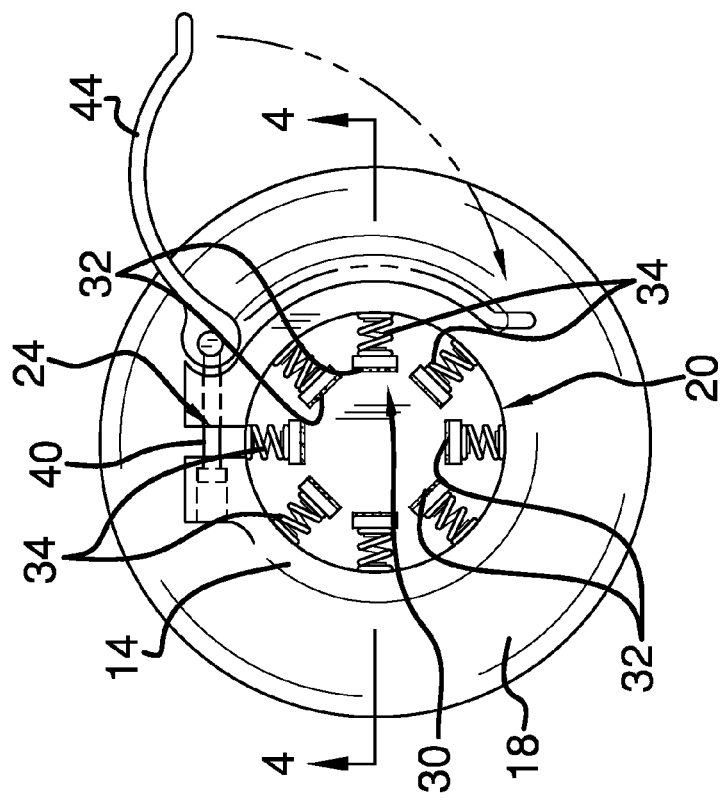

ROLLER ASSEMBLY

BACKGROUND OF THE DISCLOSURE

Field of the Disclosure

The disclosure relates to roller devices and more particularly pertains to a new roller device for allowing a walker to roll along a plurality of floor surfaces.

SUMMARY OF THE DISCLOSURE

An embodiment of the disclosure meets the needs presented above by generally comprising a housing that has a top end, a bottom end and a peripheral wall extending therebetween. The top end has a first well extending downwardly therein. The bottom end has a second well extending upwardly therein. The top end has a groove extending downwardly therein. The groove extends into the first well. The first well may insertably receive a leg of a walker. The peripheral wall is convexly arcuate, giving the housing a spherical shape. A grip is positioned within the first well. The grip may engage the leg of the walker. A lock is coupled to the housing to releasably engage the leg. A roller is coupled to the housing. The roller may roll the walker along the support surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 1 is a perspective view of a roller assembly according to an embodiment of the disclosure.

FIG. 2 is a front view of an embodiment of the disclosure.

FIG. 3 is a top view of an embodiment of the disclosure.

FIG. 4 is a cross sectional view taken along line 4-4 of FIG. 3 of an embodiment of the disclosure.

DESCRIPTION OF THE PREFERRED EMBODIMENT

Figure 5:
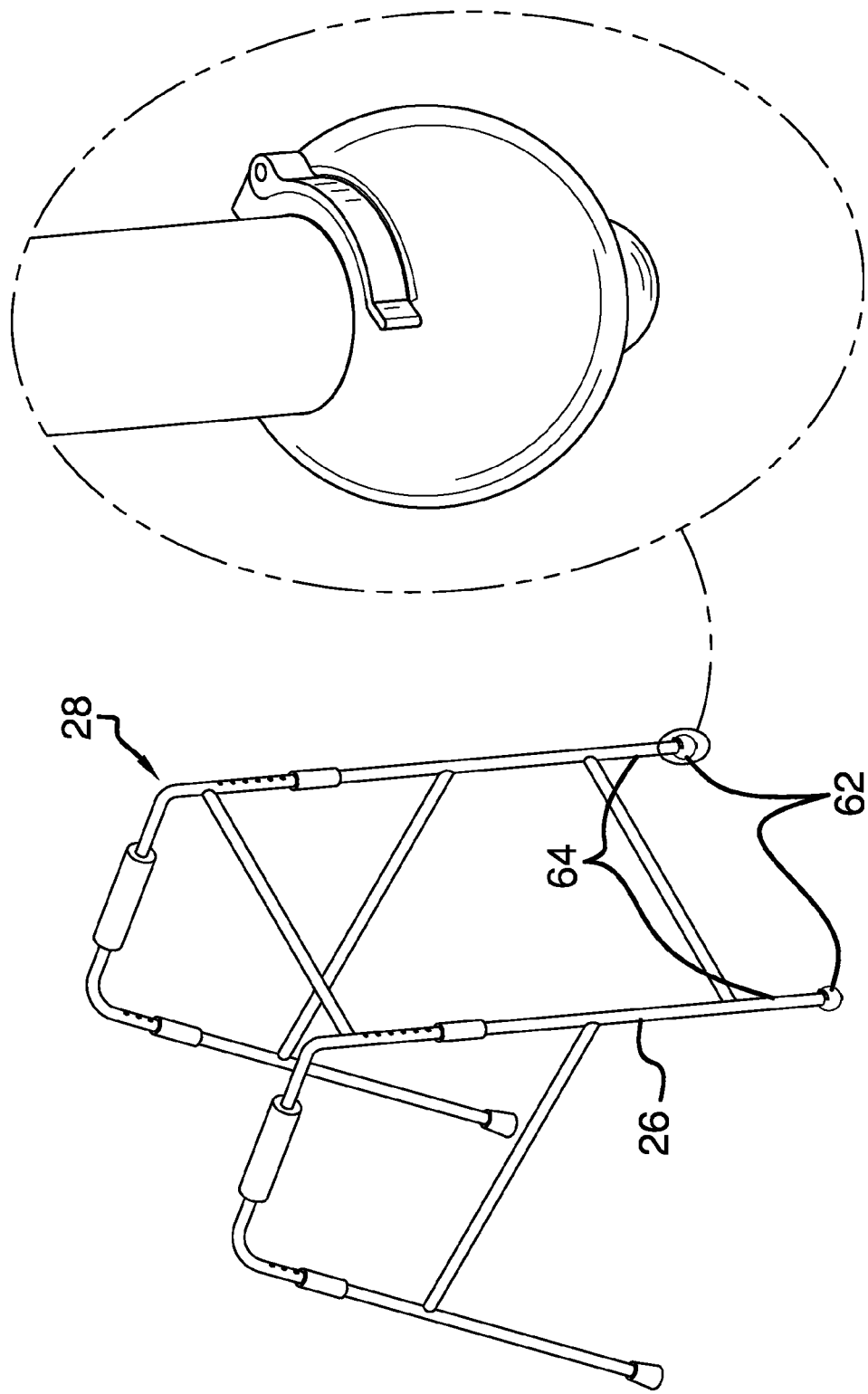
FIG. 5 is an in-use view of an embodiment of the disclosure.

With reference now to the drawings, and in particular to FIGS. 1 through 5 thereof, a new roller device embodying the principles and concepts of an embodiment of the disclosure and generally designated by the reference numeral 10 will be described.

As best illustrated in FIGS. 1 through 5, the roller assembly 10 generally comprises a housing 12 that has a top end 14, a bottom end 16 and a peripheral wall 18 extending therebetween. The top end 14 has a first well 20 extending downwardly therein. The bottom end 16 has a second well 22 extending upwardly therein.

The top end 14 has a groove 24 extending downwardly therein. The groove 24 extends into the first well 20. The first well 20 may insertably receive a leg 26 of a walker 28. The walker 28 may be a therapeutic walker of any conventional design. The peripheral wall 18 may be convexly arcuate, giving the housing 12 a spherical shape.

A grip 30 is positioned within the first well 20. The grip 30 may engage the leg 26 of the walker 28. The grip 30 comprises a plurality of pads 32 positioned within the first well 20. The pads 32 are distributed around an entire perimeter of the first well 20. A plurality of spring biasing members 34 each extends between a bounding surface 36 of the first well 20 and one of the pads 32. The spring biasing members 34 bias the pads 32 inwardly from the bounding surface 36. The pads 32 may frictionally engage the leg 26 of the walker 28.

A lock 38 is coupled to the housing 12 to releasably engage the leg 26. The lock 38 comprises a pin 40 extending through arms 42 positioned on opposite sides of the groove 24. A handle 44 is coupled to an end 46 of the pin 40. The handle 44 is positionable in a locked position to reduce a diameter of the first well 20. The lock 38 may retain the housing 12 on the leg 26 of the walker 28 when the lock 38 is positioned in the locked position. The handle 44 is positionable in an open position to increase a diameter of the first well 20. The lock 38 allows the housing 12 to be removed from the leg 26 of the walker 28 when the lock 38 is positioned in the open position.

A roller 48 is coupled to the housing 12. The roller 48 may roll the walker 28 along a support surface 50. The roller 48 comprises a ball 52 positioned within the second well 22. The ball 52 may abut the support surface 50 such that the walker 28 is easily rolled along the support surface 50. The ball 52 may be comprised of a rigid material such as titanium. Additionally, the support surface 50 may be a floor.

A bounding surface 54 of the second well 22 has a lower portion 56 and an upper portion 58. The lower portion 56 is concavely arcuate. The ball 52 rests within the lower portion 56 so the ball 52 is retained within the second well 22. A bearing 60 is positioned within the upper portion 58. The bearing 60 engages the ball 52. The bearing 60 reduces a friction of the ball 52 within the second well 22. The bearing 60 may be a ball bearing of any conventional design. Finally, the assembly 10 may be one of a pair of assemblies 62.

In use, each of the assemblies 62 is positioned on an associated one of a pair of front legs 64 of the walker 28. The front legs 64 easily roll along the support surface 50 as the walker 28 is utilized. The assemblies 62 allows the walker 28 to easily roll along various support surfaces 50 such as tile, carpet, stone, or other materials likely to be used as a floor covering.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A roller assembly configured to be coupled to a walker, said assembly comprising:
 a housing having a top end, a bottom end and a peripheral wall extending therebetween, said top end having a first well extending downwardly therein, said bottom end having a second well extending upwardly therein, said top end having a groove extending downwardly therein, said groove extending into said first well, said first well being configured to insertably receive a leg of a walker, said peripheral wall being convexly arcuate such that said housing has a spherical shape;
 a grip positioned within said first well, said grip being configured to engage the leg of the walker, said grip comprising a plurality of pads positioned within said first well, said pads being distributed around an entire perimeter of said first well;
 a lock coupled to said housing such that said housing is configured to releasably engage the leg when said lock is engaged;
 a roller coupled to said housing, said roller being configured to roll the walker along the support surface; and
 a plurality of spring biasing members each extending between a bounding surface of said first well and one of said pads, said spring biasing members biasing said pads inwardly from said bounding surface, said pads being configured to frictionally engage the leg of the walker.

2. The assembly according to claim 1, wherein said lock comprises a pin extending through arms positioned on opposite sides of said groove.

3. The assembly according to claim 2, further comprising a handle coupled to an end of said pin, said handle being positionable in a locked position to reduce a diameter of said first well, said lock being configured to retain said housing on the leg of the walker when said lock is positioned in said locked position.

4. The assembly according to claim 3, further comprising said lock being positionable in an open position to increase a diameter of said first well, said lock being configured to allow said housing to be removable from the leg of the walker when said lock is positioned in said open position.

5. The assembly according to claim 1, wherein said roller comprises a ball positioned within said second well, said ball being configured to abut the support surface such that the walker is easily rolled along the support surface.

6. The assembly according to claim 5, further comprising a bounding surface of said second well having a lower portion and an upper portion, said lower portion being concavely arcuate, said ball abutting said lower portion such that said ball is retained within said second well.

7. The assembly according to claim 6, further comprising a bearing positioned within said upper portion, said bearing engaging said ball, said bearing reducing a friction of said ball within said second well.

8. A roller assembly configured to be coupled to a walker, said assembly comprising:
 a housing having a top end, a bottom end and a peripheral wall extending therebetween, said top end having a first well extending downwardly therein, said bottom end having a second well extending upwardly therein, said top end having a groove extending downwardly therein, said groove extending into said first well, said first well being configured to insertably receive a leg of a walker, said peripheral wall being convexly arcuate such that said housing has a spherical shape;
 a grip positioned within said first well, said grip being configured to engage the leg of the walker, said grip comprising:
  a plurality of pads positioned within said first well, said pads being distributed around an entire perimeter of said first well; and
  a plurality of spring biasing members each extending between a bounding surface of said first well and one of said pads, said spring biasing members biasing said pads inwardly from said bounding surface, said pads being configured to frictionally engage the leg of the walker;
 a lock coupled to said housing such that said housing is configured to releasably engage the leg when said lock is engaged, said lock comprising:
  a pin extending through arms positioned on opposite sides of said groove; and
  a handle coupled to an end of said pin, said handle being positionable in a locked position to reduce a diameter of said first well, said lock being configured to retain said housing on the leg of the walker when said lock is positioned in said locked position, said lock being positionable in an open position to increase a diameter of said first well, said lock being configured to allow said housing to be removable from the leg of the walker when said lock is positioned in said open position;
 a roller coupled to said housing, said roller being configured to roll the walker along the support surface, said roller comprising:
  a ball positioned within said second well, said ball being configured to abut the support surface such that the walker is easily rolled along the support surface, a bounding surface of said second well having a lower portion and an upper portion, said lower portion being concavely arcuate, said ball abutting said lower portion such that said ball is retained within said second well; and
  a bearing positioned within said upper portion, said bearing engaging said ball, said bearing reducing a friction of said ball within said second well.

* * * * *